(12) United States Patent
Yokota

(10) Patent No.: US 8,238,306 B2
(45) Date of Patent: Aug. 7, 2012

(54) RADIO COMMUNICATION DEVICE AND RADIO COMMUNICATION METHOD

(75) Inventor: Tomoyoshi Yokota, Yokohama (JP)

(73) Assignee: Kyocera Corporation, Kyoto (JP)

( * ) Notice: Subject to any disclaimer, the term of this patent is extended or adjusted under 35 U.S.C. 154(b) by 17 days.

(21) Appl. No.: 12/525,046

(22) PCT Filed: Jan. 29, 2008

(86) PCT No.: PCT/JP2008/051325
§ 371 (c)(1),
(2), (4) Date: Aug. 4, 2010

(87) PCT Pub. No.: WO2008/093685
PCT Pub. Date: Aug. 7, 2008

(65) Prior Publication Data
US 2010/0290434 A1    Nov. 18, 2010

(30) Foreign Application Priority Data
Jan. 30, 2007    (JP) .................. 2007-020134

(51) Int. Cl.
*H04L 12/56*    (2006.01)
*H04J 1/16*    (2006.01)
(52) U.S. Cl. ......... 370/331; 370/252; 370/329; 370/430
(58) Field of Classification Search .............. 370/252, 370/329, 331, 430
See application file for complete search history.

(56) References Cited

U.S. PATENT DOCUMENTS

| | | | |
|---|---|---|---|
| 6,510,189 B1 | 1/2003 | Hiramatsu et al. ............ 375/349 |
| 7,266,101 B2 | 9/2007 | Dorenbosch ................... 370/331 |
| 7,860,502 B2 * | 12/2010 | Kim et al. ...................... 455/436 |
| 7,949,299 B2 * | 5/2011 | Rudolf et al. ................. 455/3.06 |
| 2004/0192221 A1 | 9/2004 | Matsunaga ....................... 455/76 |
| 2004/0264414 A1 | 12/2004 | Dorenbosch ................... 370/332 |
| 2006/0046643 A1 | 3/2006 | Izumikawa et al. ............... 455/7 |

FOREIGN PATENT DOCUMENTS

| | | |
|---|---|---|
| EP | 1 465 451 A2 | 10/2004 |
| JP | 2006-074325 | 3/2006 |
| JP | 2006238451 A | 9/2006 |
| JP | 2006254438 A | 9/2006 |
| WO | WO 99/13665 | 3/1999 |
| WO | WO 2005/006571 A2 | 1/2005 |

OTHER PUBLICATIONS

IEEE, "Physical and Medium Access Control Layers for Combined Fixed and Mobile Operation in Licensed Bands" IEEE Std. 802.16-2005 and IEEE Std 802.16-2004/Cor1-2005 (Amendment and Corrigendum to IEEE Std 802.16-2004), pp. 1-864, Feb. 28, 2006.
Japanese language office action dated Apr. 10, 2012 and its English translation issued in corresponding Japanese application 2007020134 cites the foreign patent documents above.

* cited by examiner

*Primary Examiner* — John Pezzlo
(74) *Attorney, Agent, or Firm* — DLA Piper LLP (US)

(57) ABSTRACT

A radio communication terminal 300 detects the number of transmission repetitions of DL-MAPs repeatedly transmitted by radio base stations 200A, 200B. The radio communication terminal 300 also acquires an interference value indicating an extent of interference of a received radio signal. The radio communication terminal 300 executes handover from the radio communication system 200 to a radio communication system 100, when the detected number of transmission repetitions exceeds a predetermined number of times, and also when the acquired interference value exceeds a predetermined threshold.

12 Claims, 5 Drawing Sheets

RADIO COMMUNICATION DEVICE AND RADIO COMMUNICATION METHOD

CROSS-REFERENCE TO THE RELATED APPLICATIONS

This application is a national stage of international application No. PCT/JP2008/051325 filed on Jan. 29, 2008, which also claims the benefit of priority under 35 USC 119 to Japanese Patent Application No. 2007-020134 filed on Jan. 30, 2007, the entire contents of which are incorporated herein by reference.

TECHNICAL FIELD

The present invention relates to a radio communication device and a radio communication method which are used in a radio communication system in accordance with an orthogonal frequency division multiple access scheme capable of providing multiple subchannels.

BACKGROUND ART

In recent years, radio communication systems capable of providing a wider communication bandwidth (communication speed) have been proposed along with progress of radio communication techniques. For example, in the mobile WiMAX recommended in IEEE002.16e, a wide communication bandwidth can be provided simultaneously to a large number of radio communication devices by using the orthogonal frequency division multiple access scheme (OFDMA) and the time division duplex scheme (TDD).

Since the TDD is used in the mobile WiMAX, a downlink subframe and an uplink subframe are included in the same OFDM frame. In the downlink subframe, allocation information of transmitted data (data burst) for a subchannel in the downlink subframe, i.e., a so-called DL-MAP is repeatedly transmitted to a radio communication device from a radio base station (for example, Patent Document 1).

In the radio communication device, reception processing (demodulation processing) of the data burst addressed to the radio communication device is executed based on the DL-MAP included in the received downlink subframe.

Patent Document 1: Japanese Patent Application Publication No. 2006-74325 (pages 5 to 6, FIG. 4)

DISCLOSURE OF THE INVENTION

However, transmission of the allocation information of the transmitted data in the mobile WiMAX mentioned above has had the following problem. Specifically, in the mobile WiMAX using the OFDMA, multiple radio base stations may transmit the allocation information of the transmitted data, specifically, DL-MAPs at the same timing using the same frequency. In particular, when a scheme in which available subcarriers (subchannels) are allocated to all the radio base stations (cells/sectors), i.e., a so-called fully subchannelization scheme (FUSC) is employed, multiple adjacent radio base stations may transmit DL-MAPs at the same timing using the same frequency.

When the multiple adjacent radio base stations transmit the DL-MAPs at the same timing using the same frequency, in an area where the cells and the sectors overlap each other, radio signals transmitted by the multiple radio base stations interfere with each other. For this reason, there has been a problem that the radio communication device cannot receive the DL-MAP properly, and therefore the communication quality remarkably deteriorates.

In consideration of the foregoing problems, it is an object of the present invention to provide a radio communication device and a radio communication method which are capable of continuing radio communications while avoiding deterioration of the communication quality in an area, for example, where cells/sectors of the radio communication system using the OFDMA overlap each other.

In order to solve the foregoing problems, the present invention includes characteristics described below. First, a first characteristic of the present invention is summarized as a radio communication device (radio communication terminal 300) which is used in a radio communication system (radio communication system 200) in accordance with an orthogonal frequency division multiple access scheme capable of providing a plurality of subchannels (subchannel $CH_S$), and which is configured to receive allocation information (DL-MAP) of transmitted data (downlink burst) for each of the subchannels from a radio base station (for example, radio base station 200A) and to execute reception processing of the transmitted data based on the received allocation information, the radio communication device comprising: a repetition number detector (map acquirer 309) configured to detect the number of transmission repetitions of the allocation information repeatedly transmitted by the radio base station; an interference value acquirer (communication quality measurement unit 305) configured to acquire an interference value indicating an extent of interference of a received radio signal (for example, interference level acquired based on the CIR); and a handover executer (network controller 311) configured to execute handover to another radio communication system (radio communication system 100) different from the radio communication system when the number of transmission repetitions detected by the repetition number detector exceeds a predetermined number of times, and also when the interference value acquired by the interference value acquirer exceeds a predetermined threshold.

A second characteristic of the present invention is summarized as a radio communication device (radio communication terminal 300) which is used in a radio communication system (radio communication system 200) in accordance with an orthogonal frequency division multiple access scheme capable of providing a plurality of subchannels (subchannel $CH_S$), and which is configured to receive allocation information (DL-MAP) of transmitted data (downlink burst) for each of the subchannels from a radio base station (for example, radio base station 200A) and to execute reception processing of the transmitted data based on the received allocation information, the radio communication device comprising: a reception success rate calculator (map acquirer 309) configured to calculate a reception success rate indicating a rate whether a reception of the allocation information was successful or not, the allocation information is repeatedly transmitted by the radio base station; and a handover executer (network controller 311) configured to execute handover to another radio communication system (radio communication system 100) different from the radio communication system when the reception success rate calculated by the reception success rate calculator falls below a predetermined threshold.

A third characteristic of the present invention is summarized as a radio communication device according to the second characteristic, further comprising: an interference value acquirer (communication quality measurement unit 305) configured to acquire an interference value indicating an extent of interference of a received radio signal (for example, interference level acquired based on the CIR), wherein the handover executer executes the handover when the reception success rate calculated by the reception success rate calculator falls below a predetermined threshold, and also when the interference value acquired by the interference value acquirer exceeds a predetermined threshold.

A fourth characteristic of the present invention is summarized as a radio communication device (radio communication terminal 300) which is used in a radio communication system (radio communication system 200) in accordance with an orthogonal frequency division multiple access scheme capable of providing a plurality of subchannels (subchannel $CH_S$), and which is configured to receive allocation information (DL-MAP) of transmitted data (downlink burst) for each of the subchannels from a radio base station (for example, radio base station 200A) and to execute reception processing of the transmitted data based on the received allocation information, the radio communication device comprising: a repetition number detector (map acquirer 309) configured to detect the number of transmission repetitions of the allocation information repeatedly transmitted by the radio base station; an interference value acquirer (communication quality measurement unit 305) configured to acquire an interference value indicating an extent of interference of a received radio signal (for example, interference level acquired based on the CIR); and a communication controller (network controller 311) configured to execute radio communication by using the radio communication system and another radio communication system (radio communication system 100) different from the radio communication system when the number of transmission repetitions detected by the repetition number detector exceeds a predetermined number of times, and also when the interference value acquired by the interference value acquirer exceeds a predetermined threshold.

A fifth characteristic of the present invention is summarized as a radio communication device (radio communication terminal 300) which is used in a radio communication system (radio communication system 200) in accordance with an orthogonal frequency division multiple access scheme capable of providing a plurality of subchannels (subchannel $CH_S$), and which is configured to receive allocation information (DL-MAP) of transmitted data (downlink burst) for each of the subchannels from a radio base station (for example, radio base station 200A) and to execute reception processing of the transmitted data based on the received allocation information, the radio communication device comprising: a reception success rate calculator (map acquirer 309) configured to calculate a reception success rate indicating a rate whether a reception of the allocation information was successful or not, the allocation information is repeatedly transmitted by the radio base station; and a communication controller (network controller 311) configured to execute radio communication by using the radio communication system and another radio communication system (radio communication system 100) different from the radio communication system when the reception success rate calculated by the reception success rate calculator falls below a predetermined threshold.

A sixth characteristic of the present invention is summarized as a radio communication device according to the fifth characteristic, further comprising: an interference value acquirer (communication quality measurement unit 305) configured to acquire an interference value indicating an extent of interference of a received radio signal (for example, interference level acquired based on the CIR), wherein the communication controller executes the radio communication by using the radio communication system and the another radio communication system when the reception success rate calculated by the reception success rate calculator falls below a predetermined threshold, and also when the interference value required by the interference value acquirer exceeds a predetermined threshold.

A seventh characteristic of the present invention is summarized as a radio communication method which is used in a radio communication system in accordance with an orthogonal frequency division multiple access scheme capable of providing a plurality of subchannels and which includes: receiving allocation information of transmitted data for each of the subchannels from a radio base station; and executing reception processing of the transmitted data based on the received allocation information, the radio communication method comprising the steps of: detecting the number of transmission repetitions of the allocation information repeatedly transmitted by the radio base station; acquiring an interference value indicating an extent of interference of a received radio signal; and executing handover to another radio communication system different from the radio communication system when the detected number of transmission repetitions exceeds a predetermined number of times, and also when the acquired interference value exceeds a predetermined threshold.

An eighth characteristic of the present invention is summarized as a radio communication method which is used in a radio communication system in accordance with an orthogonal frequency division multiple access scheme capable of providing a plurality of subchannels and which includes: receiving allocation information of transmitted data for each of the subchannels from a radio base station; and executing reception processing of the transmitted data based on the received allocation information, the radio communication method comprising the steps of: calculating a reception success rate indicating a rate whether a reception of the allocation information was successful or not, the allocation information is repeatedly transmitted by the radio base station; and executing handover to another radio communication system different from the radio communication system when the calculated reception success rate falls below a predetermined threshold.

A ninth characteristic of the present invention is summarized as a radio communication device according to the eighth characteristic, further comprising the step of acquiring an interference value indicating an extent of interference of a received radio signal, wherein the handover is executed in the step of executing handover when the calculated reception success rate falls below a predetermined threshold, and also when the acquired interference value exceeds a predetermined threshold.

A tenth characteristic of the present invention is summarized as a radio communication method which is used in a radio communication system in accordance with an orthogonal frequency division multiple access scheme capable of providing a plurality of subchannels and which includes: receiving allocation information of transmitted data for each of the subchannels from a radio base station; and executing reception processing of the transmitted data based on the received allocation information, the radio communication method comprising the steps of: detecting the number of transmission repetitions of the allocation information repeatedly transmitted by the radio base station; acquiring an interference value indicating an extent of interference of a received radio signal; and executing radio communication by using the radio communication system and another radio communication system different from the radio communication system when the detected number of transmission repetitions exceeds a predetermined number of times, and also when the acquired interference value exceeds a predetermined threshold.

An eleventh characteristic of the present invention is summarized as a radio communication method which is used in a radio communication system in accordance with an orthogonal frequency division multiple access scheme capable of providing a plurality of subchannels and which includes: receiving allocation information of transmitted data for each of the subchannels from a radio base station; and executing reception processing of the transmitted data based on the received allocation information, the radio communication method comprising the steps of: calculating a reception success rate indicating a rate whether a reception of the allocation information was successful or not, the allocation information is repeatedly transmitted by the radio base station; and executing radio communication by using the radio communication system and another radio communication system different from the radio communication system when the calculated reception success rate falls below a predetermined threshold.

An twelfth characteristic of the present invention is summarized as a radio communication device according to the eleventh characteristic, further comprising the step of acquiring an interference value indicating an extent of interference of a received radio signal, wherein handover the radio communication by using the radio communication system and the another radio communication system is executed in the step of executing when the calculated reception success rate falls below a predetermined threshold, and also when the acquired interference value exceeds a predetermined threshold.

Namely, according to the characteristics of the present invention, it is possible to provide a radio communication device and a radio communication method which are capable of providing radio communications while avoiding deterioration of the communication quality in an area, for example, where cells/sectors of the radio communication system using the OFDMA overlap each other.

BEST MODE FOR CARRYING OUT THE INVENTION

Figure 1:
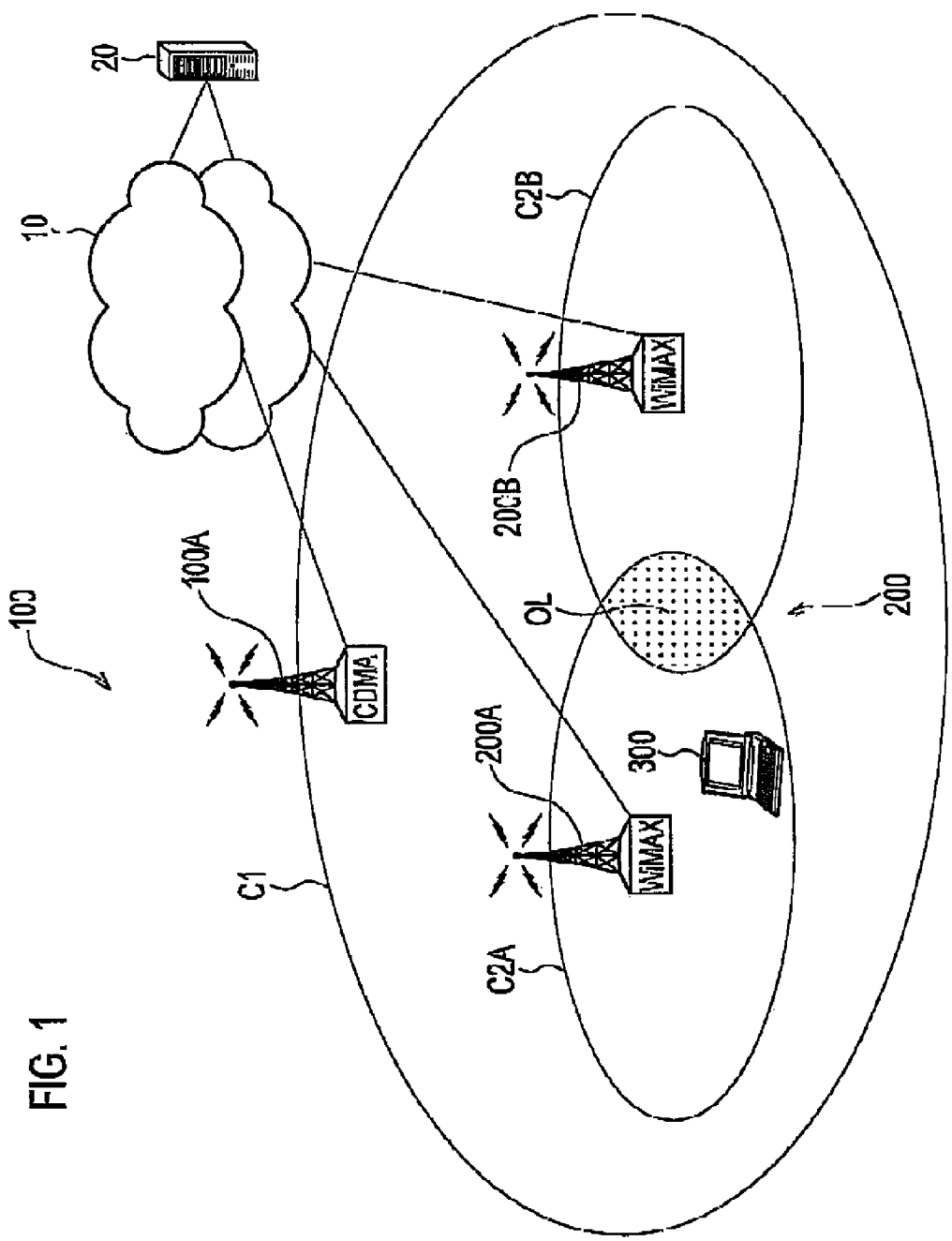
FIG. 1 is an overall schematic configuration diagram of a communication network including a radio communication system according to an embodiment of the present invention.

Next, an embodiment of the present invention will be described. Note that the same or similar portions are denoted by the same or similar reference numerals in the descriptions of the drawings below. It should be noted, however, that the drawings are schematic only, and that ratio of each dimension and the like differ from those in reality.

Accordingly, specific dimensions and the like should be determined in consideration of the descriptions below. In addition, it goes without saying that dimensional relations and ratios among the drawings include inconsistent ones.
(Overall Schematic Configuration of Communication Network)

FIG. 1 is an overall schematic configuration diagram of a communication network including radio communication systems according to the present embodiment. As shown in FIG. 1, the communication network according to the present embodiment includes a backbone network 10, a radio communication system 100, and a radio communication system 200.

The backbone network 10 is connected to the radio communication system 100 and the radio communication system 200.

The radio communication system 100 uses the code division multiple access (CDMA), specifically, HRPD (high rate packet data) which is the specification of 3GPP2, ss a radio communication scheme.

The radio communication system 200 uses the orthogonal frequency division multiple access (OFDMA) scheme as a radio communication scheme. In the present embodiment, the radio communication system 200 is compliant with the mobile WiMAX specified by IEEE802.16e. In the mobile WiMAX in which the orthogonal frequency division multiple access scheme is used, multiple subchannels $CH_S$ (not shown in FIG. 1. See FIG. 6) can be provided. Moreover, the time division duplex (TDD) scheme is used in the radio communication system 200 being compliant with the mobile WiMAX.

The radio communication system 100 includes a radio base station 100A. The radio base station 100A forms a cell C1.

The radio communication system 200 includes radio base stations 200A and 200B. The radio base station 200A forms a cell C2A. The radio base station 200B forms a cell C2B. The cell C2A has an overlap area OL that overlaps the cell C2B. In the overlap area OL, an interference between a radio signal transmitted by the radio base station 200A and a radio signal transmitted by the radio base station 200B may occur.

Specifically, when the radio base station 200A and the radio base station 200B simultaneously transmit radio signals using the same frequency, the interference of the radio signals may occur.

In addition, the cell C1 has an area larger than an area of the cell C2A and an area of the cell C2B. Specifically, the cell C2A and the cell C2B are located within the cell C1.

A radio communication terminal 300 is a radio communication device that can be used in the radio communication system 100 and the radio communication system 200. In other words, the radio communication terminal 300 is compatible with both of radio communication scheme, i.e., the CDMA and the OFDMA (mobile WiMAX).

The radio communication terminal 300 can transmit and receive VoIP (voice over IP) packets through the radio communication system 100 or the radio communication system 200. In other words, the radio communication terminal 300 can provide a so-called IP telephone service.

A switching server 20 controls a communication path between the radio communication terminal 300 and a communication destination (not shown) of the radio communication terminal 300. Specifically, the switching server 20 can transmit the IP packets to the radio communication terminal 300 through the radio communication system 100 or the radio communication system 200.

Moreover, in the radio communication system 100, a care-of IP address is dynamically assigned to the radio communication terminal 300 in accordance with a position or the radio communication terminal 300. In the similar manner, in the radio communication system 200, a care-of IP address is dynamically assigned to the radio communication terminal 300 in accordance with a position of the radio communication terminal 300. Moreover, in the present embodiment, the care-of IP address assigned in the radio communication system 100 and the care-of IP address assigned in the radio communication system 200 are associated with a home IP address (virtual address) in the radio communication terminal 300.

Furthermore, in the present embodiment, a tunnel by use of VPN (IPSec) is established between the switching server 20 and the radio communication terminal 300. By establishment of the tunnel, virtualization of the third layer of the OSI is implemented and IP mobility of the radio communication terminal 300 is ensured.

In other words, unlike a mobile IP (for example, RFC2002), in the present embodiment, the radio communication terminal 300 can execute communications with a communication destination (not shown) while simultaneously using both of a communication path set through the radio communication system 100 and a communication path set through the radio communication system 200.

(Functional Block Configuration of the Radio Communication Terminal 300)

Figure 2:
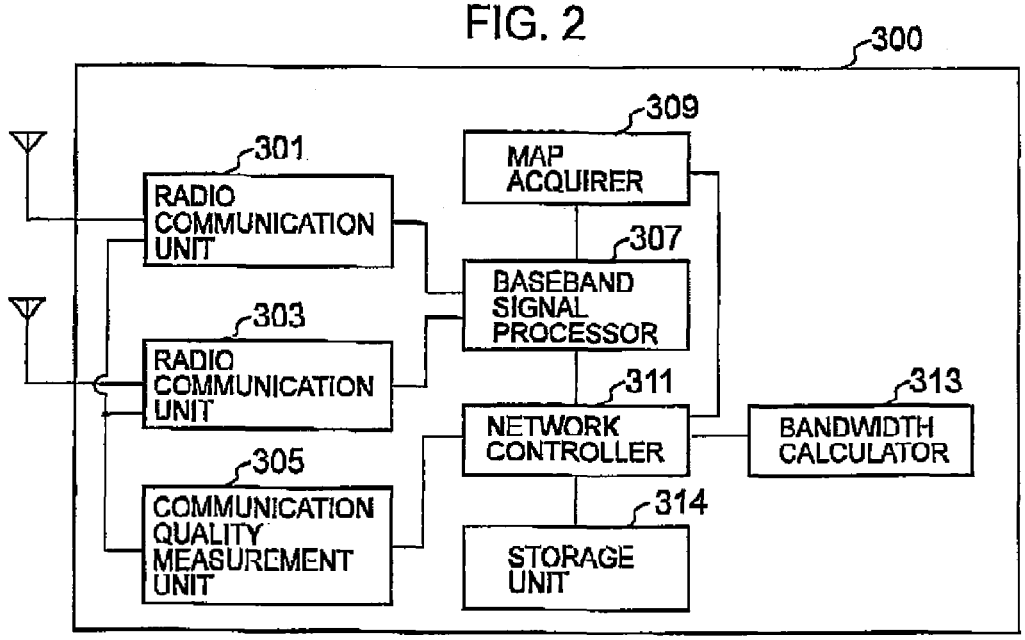
FIG. 2 is a functional block configuration diagram of a radio communication device according to the embodiment of the present invention.

FIG. 2 is a functional block configuration diagram of the radio communication terminal 300. As shown in FIG. 2, the radio communication terminal 300 includes a radio communication unit 301, a radio communication unit 303, a communication quality measurement unit 305, a baseband signal processor 307, a map acquirer 309, a network controller 311, a bandwidth calculator 313, and a storage unit 314.

The radio communication unit 301 transmits and receives radio signals in accordance with the CDMA to and from the radio base station 100A.

The radio communication unit 303 transmits and receives radio signals in accordance with the mobile WiMAX, specifically, the OFDMA and the TDD, to and from the radio base station 200A (or the radio base station 200B).

The radio communication unit 303 receives allocation information of the transmitted data for the subchannel $CH_S$ from the radio base station 200A (or the radio base station 200B). Here, FIG. 6 shows an example of a configuration of an OFDM frame F that the radio base station 200A (radio base station 200B) transmits and receives to and from the radio communication terminal 300.

Figure 6:
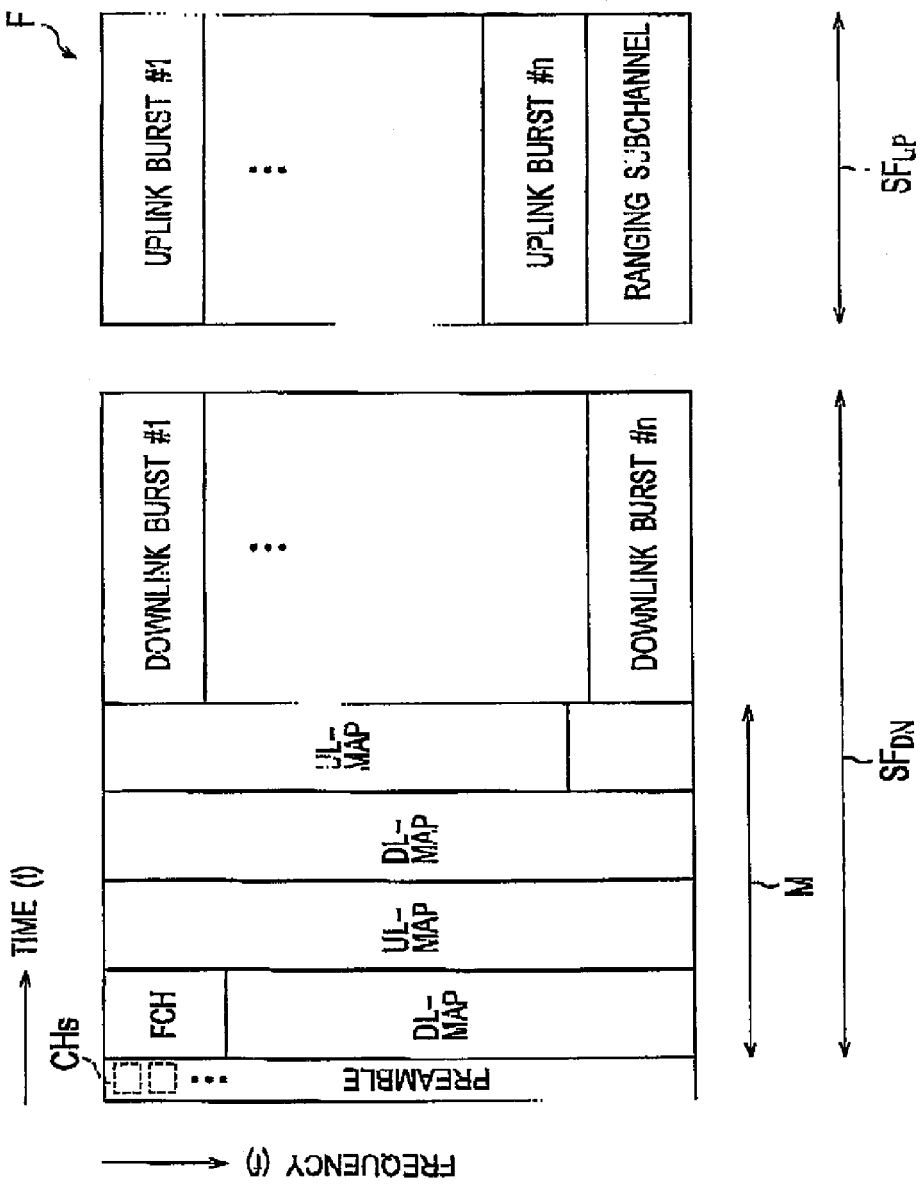
FIG. 6 is a diagram showing an example of a configuration of an OFDM frame transmitted and received by a radio base station and the radio communication device according to the embodiment of the present invention.

As shown in FIG. 6, the OFDM frame F includes a downlink subframe $SF_{DN}$ used for radio communications in a downlink (radio base station→radio communication terminal) and an uplink subframe $SF_{UP}$ used for radio communications in an uplink (radio communication terminal→radio base station).

A map region M used for transmission of a DL-MAP, which is the allocation information of the transmitted data (downlink burst) for the subchannel $CH_S$, is provided in the downlink subframe $SF_{DN}$. The radio base station 200A (radio base station 200B) can repeatedly transmit the DL-MAP having an identical content.

The radio communication terminal 300 receives the DL-MAP from the radio base station 200A (radio base station 200B), and executes reception processing of the transmitted data (downlink burst) addressed to the radio communication terminal 300 based on the received DL-MAP. In other words, the radio communication terminal 300 specifies the subchannel $CH_S$ including the transmitted data addressed to the radio communication terminal 300 itself based on the received DL-MAP, and executes reception processing (such as demodulation) within the specified subchannel $CH_S$ (combination of the frequency and the time).

The communication quality measurement unit 305 measures the communication quality of a radio signal received by the radio communication unit 301 and the radio communication unit 303. Specifically, the communication quality measurement unit 305 measures a carrier to interference ratio (CIR) of the received radio signal and/or a signal to noise ratio (SNR) of the received radio signal. In particular, in the present embodiment, the communication quality measurement unit 305 acquires an interference value indicating an extent of interference of the radio signal received by the radio communication unit 303 from the radio base station 200A (radio base station 200B), specifically, acquires an interference level of the radio signal based on the CIR. In the present embodiment, the communication quality measurement unit 305 forms an interference value acquirer.

The baseband signal processor 307 is connected to the radio communication unit 301 and the radio communication unit 303. The baseband signal processor 307 executes processing with respect to a baseband signal, such as user data, control data.

In particular, in the present embodiment, the baseband signal processor 307 transmits and receives IP packets based on the care-of IP address assigned to the radio communication terminal 300 (radio communication unit 301) in the radio communication system 100. In the similar manner, the baseband signal processor 307 transmits and receives IP packets based on the care-of IP address assigned to the radio communication terminal 300 (radio communication unit 303) in the radio communication system 200.

Figure 7:
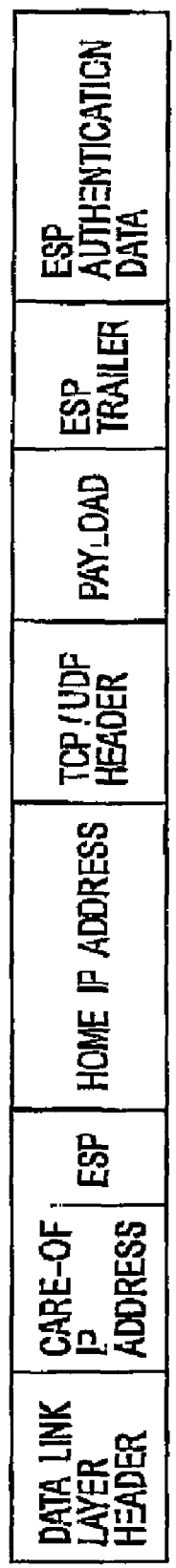
FIG. 7 is a diagram showing a configuration of a VoIP packet transmitted and received by the radio communication device according to the embodiment of the present invention.

Moreover, since VPN with IPSec is set up in the present embodiment as mentioned above, a VoIP packet transmitted and received between the switching server 20 and the radio communication terminal 300 (specifically, a VoIP packet transmitted by the radio communication terminal 300) has a configuration shown in FIG. 7. As shown in FIG. 7, a home IP address, a TCP/UDP header, and a payload are encapsulated, and a care-of IP address is added.

The map acquirer 309 acquires the DL-MAP received through the radio communication unit 303. The map acquirer 309 detects the number of transmission repetitions (repetition) of the DL-MAP repeatedly transmitted by the radio base station 200A (or the radio base station 200B). In the present embodiment, the map acquirer 309 forms a repetition number detector.

Specifically, the map acquirer 309 detects the number of transmission repetitions of the DL-MAP in the map region M provided in the downlink subframe $SF_{DN}$ (see FIG. 6). For example, in the map region M provided in the downlink subframe $SF_{DN}$, the map acquirer 309 detects that the DL-MAP having an identical content is transmitted twice.

Furthermore, the map acquirer 309 calculates a reception success rate indicating a rate whether the reception of the DL-MAP, that is repeatedly transmitted by the radio base station 200A (or radio base station 200B), was successful or not. In the present embodiment, the map acquirer 309 forms a reception success rate calculator.

For example, the map acquirer 309 calculates the reception success rate based on the number of times the DL-MAP can be received properly within a period of time that is n times as long as that of the OFDM frame F. Note that the map acquirer 309 can calculate the reception success rate based on the number of transmission repetitions, when the number of transmission repetitions of the DL-MAP is recognized in advance, for example, when the number of transmission repetitions of the DL-MAP is fixed.

The network controller 311 executes control on a communication network to which the radio communication terminal 300 connects. Specifically, the network controller 311 executes control on connection to the radio base station with which the radio communication terminal 300 executes radio communications, i.e., the radio communication system 100 or the radio communication system 200.

In particular, in the present embodiment, the network controller 311 executes handover from the radio communication system 200 to the radio communication system 100 (different radio communication system), when the number of transmission repetitions of the DL-MAP detected by the map acquirer 309 exceeds a predetermined number of times and the interference value acquired by the communication quality measurement unit 305 (the interference level acquired based on the CIR) exceeds a predetermined threshold. In the present embodiment, the network controller 311 forms a handover executer.

Specifically, when the radio communication terminal 300 is executing radio communications with the radio base station 200A (or the radio base station 200B) through the radio communication unit 303 and the following conditions are satisfied, the network controller 311 executes the handover from the radio communication system 200 to the radio communication system 100.

That is, when the number of transmission repetitions of the DL-MAP exceeds the predetermined number of times (for example, 3 times) and the interference level of the radio signal received from the radio base station 200A (or the radio base station 200B) exceeds the predetermined threshold, the network controller 311 executes the handover to the radio communication system 100.

Furthermore, instead of the handover to the radio communication system 100, the network controller 311 can also execute radio communications by newly using the radio communication system 100 in addition to the radio communication system 200 used so far. In the present embodiment, the network controller 311 forms a communication controller.

In other words, the network controller 311 can also use the radio communication system 100 and the radio communication system 200 together, when the number of transmission repetitions of the DL-MAP exceeds the predetermined number of times and the interference level of the radio signal received from the radio base station 200A (or the radio base station 200B) exceeds the predetermined threshold.

Specifically, the network controller 311 transmits IP packets to which the care-of IP address assigned in the radio communication system 100 or the care-of IP address assigned in the radio communication system 200 is added, from the baseband signal processor 307. The baseband signal processor 307 outputs, to the radio communication unit 301 or the radio communication unit 303, the IP packets corresponding to each. Meanwhile, in the downlink, the switching server 20 transmits, to the radio communication system 100 or the radio communication system 200, IP packets to which the care-of IP address corresponding to each is added.

Moreover, the network controller 311 executes handover from the radio communication system 200 to the radio communication system 100, when the reception success rate (acquisition success rate) of the DL-MAP calculated by the map acquirer 309 falls below a predetermined threshold. Note that it is preferable to determine a state of the radio communication terminal 300 more accurately by additionally determining whether or not the interference value acquired by the communication quality measurement unit 305 exceeds the predetermined threshold.

Specifically, when the radio communication terminal 300 is executing radio communications with the radio base station 200A (or the radio base station 200B) through the radio communication unit 303 and the following conditions are satisfied, the network controller 311 executes the handover from the radio communication system 200 to the radio communication system 100.

That is, when the reception success rate of the DL-MAP falls below the predetermined threshold (for example, 0.3), the network controller 311 executes the handover to the radio communication system 100. Note that it is preferable to determine a state of the radio communication terminal 300 more accurately by additionally determining whether or not the interference level of the radio signal received from the radio base station 200A (or the radio base station 200B) exceeds the predetermined threshold.

Furthermore, instead of the handover to the radio communication system 100, the network controller 311 can also execute radio communications by newly using the radio communication system 100 in addition to the radio communication system 200 used so far. In other words, the network controller 311 can also use the radio communication system 100 and the radio communication system 200 together, when the reception success rate of the DL-MAP falls below the predetermined threshold. Note that it is preferable to determine a state of the radio communication terminal 300 more accurately by additionally determining whether or not the interference level of the radio signal received from the radio base station 200A (or the radio base station 200B) exceeds the predetermined threshold.

When the radio communication system 100 and the radio communication system 200 are used together, the bandwidth calculator 313 calculates a communication bandwidth (communication speed) to be requested to each radio communication system.

Specifically, the bandwidth calculator 313 calculates the communication bandwidth based on the number of IP packets received through each radio communication system within a predetermined period of time (for example, one second). For example, when the same number of VoIP packets are received for one second through the radio communication systems 100 and 200, the bandwidth calculator 313 determines approximately the same communication bandwidth to be requested to the radio communication systems 100 and 200.

The storage unit 314 stores the aforementioned predetermined number of times, which is a decision criterion of the number of transmission repetitions of the allocation information (DL-MAP), and the predetermined threshold, which is a decision criterion of the interference value and the like. The storage unit 314 also stores the aforementioned predetermined threshold, which is a decision criterion of the reception success rate.

(Operation of Radio Communication Device)

Next, operation of the radio communication terminal 300 will be described. Specifically, description will be given on operation in which the radio communication terminal 300 executes handover to a different radio communication system based on a state of the DL-MAP included in the downlink subframe $SF_{DN}$.

(1) Operation Example 1

Figure 3:
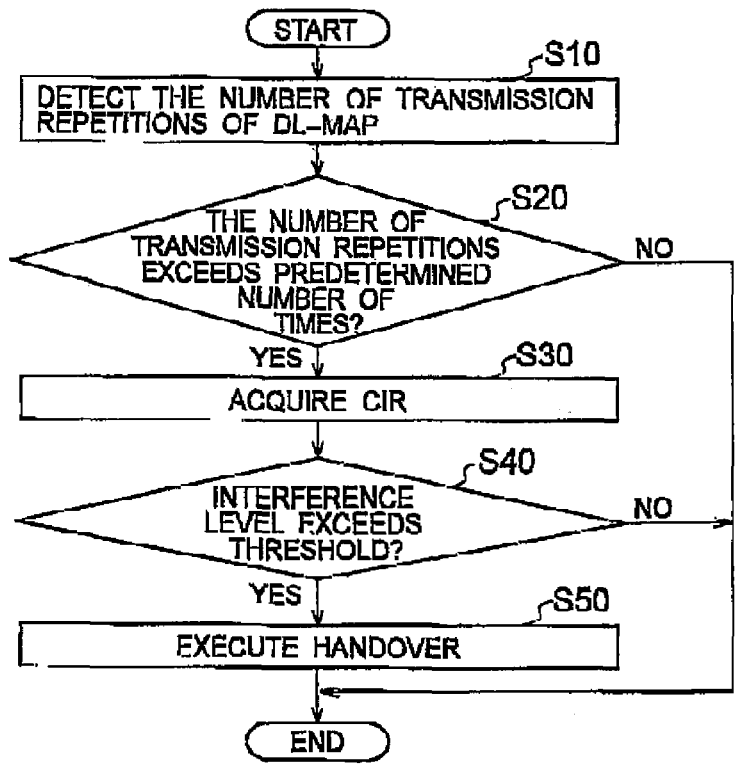
FIG. 3 shows a flow of operation through which the radio communication device according to the embodiment of the present invention executes handover to a different radio communication system based on the number of transmission repetitions of a DL-MAP.

FIG. 3 shows a flow that shows operation in which the radio communication terminal 300 executes handover to a different radio communication system, based on the number of transmission repetitions of the DL-MAP. Here, the radio communication terminal 300 is executing radio communications with the radio base station 200A (radio communication system 200).

As shown in FIG. 3, in Step S10, the radio communication terminal 300 detects the number of transmission repetitions (repetition) of the DL-MAP included in the downlink subframe $SF_{DN}$. In the present embodiment, when it is detected that the radio communication terminal 300 approached an outer edge part (cell fringe) of the cell C2A (see FIG. 1) based on transmission power of the radio communication terminal 300, the CIR in the radio communication terminal 300, a packet error rate (PER), or the like, the radio base station 200A (200B) increases the number of transmission repetitions of the DL-MAP.

In Step S20, the radio communication terminal 300 determines whether or not the number of transmission repetitions of the DL-MAP exceeds the predetermined number of times (for example, three times).

When the number of transmission repetitions of the DL-MAP exceeds the predetermined number of times (YES in Step S20), in Step S30, the radio communication terminal 300 acquires the CIR of the radio signal received from the radio base station 200A. Furthermore, the radio communication terminal 300 acquires the interference level of the radio signal based on the CIR.

In Step S40, the radio communication terminal 300 determines whether or not the interference level of the radio signal received from the radio base station 200A exceeds the predetermined threshold. Note that, when the radio communication terminal 300 moves into the overlap area OL, the radio signal from the radio base station 200A received by the radio communication terminal 300 may interfere with a radio signal transmitted by the radio base station 200B in the same frequency. For this reason, when the radio communication terminal 300 moves into the overlap area OL, the interference level of the radio signal received from the radio base station 200A may exceed the predetermined threshold.

When the interference level of the radio signal received from the radio base station 200A exceeds the predetermined threshold (YES in Step 340), in Step S50, the radio communication terminal 300 executes handover from the radio communication system 200 to the radio communication system 100. Specifically, the radio communication terminal 300 stops radio communications with the radio base station 200A, and starts radio communications with the radio base station 100A.

(2) Operation Example 2

Figure 4:
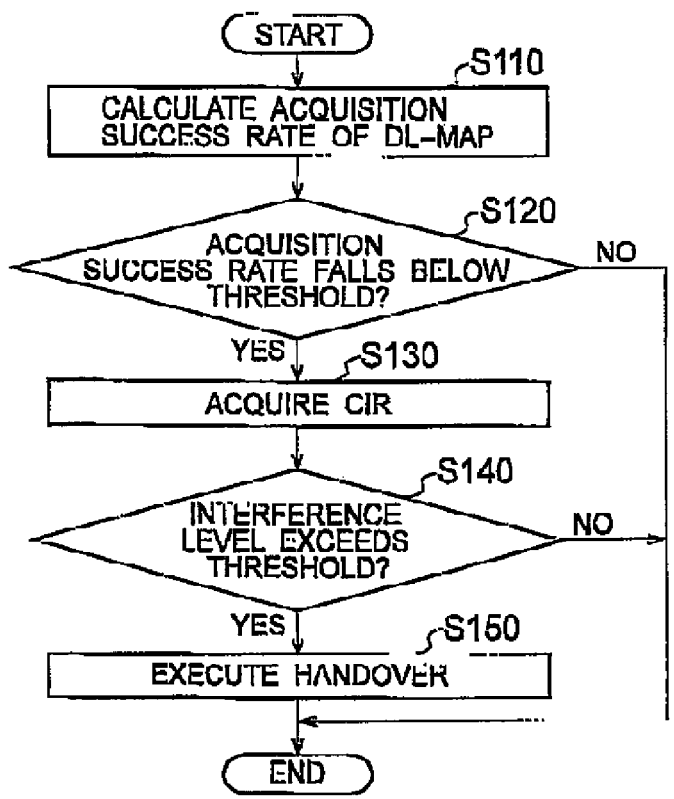
FIG. 4 shows a flow of operation through which the radio communication device according to the embodiment of the present invention executes handover to a different radio communication system based on reception success rate of the DL-MAP.

FIG. 4 shows a flow that shows operation in which the radio communication terminal 300 executes handover to a different radio communication system, based on the reception success rate (acquisition success rate) of the DL-MAP. Hereinafter, points different from those of the operation shown in FIG. 3 will mainly be described.

In Step S110, the radio communication terminal 300 detects the reception success rate (acquisition success rate) of the DL-MAP included in the downlink sub frame $SF_{DN}$. For example, as mentioned above, the radio communication terminal 300 calculates the reception success rate (acquisition success rate) based on the number of times the DL-MAP has been received properly within a period of time that is n times as long as that of the OFDM frame F.

In Step S120, the radio communication terminal 300 determines whether or not the reception success rate (acquisition success rate) of the DL-MAP falls below a predetermined threshold.

When the reception success rate (acquisition, success rate) of the DL-MAP falls below the predetermined threshold (YES in Step S120), in Step S130, the radio communication terminal 300 acquires the CIR and interference level of the radio signal received from the radio base station 200A.

Operation in Steps S140 and S150 is the same as the operation in Steps S40 and S50 shown in FIG. 4. Incidentally, the operation in Step S140 can be omitted.

(3) Combined Use of Multiple Radio Communication Systems

While the radio communication terminal 300 executes the handover from the radio communication system 200 to the radio communication system 100 in the operation flow mentioned above, the radio communication terminal 300 can also use the radio communication system 100 and the radio communication system 200 together instead of the handover from the radio communication system 200 to the radio communication system 100.

Figure 5:
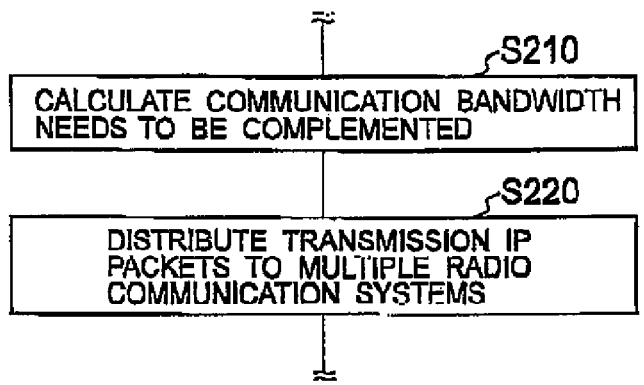
FIG. 5 is a diagram showing a flow of an operation executed instead of the operation in Step S50 shown in FIG. 3 and in Step S150 shown in FIG. 4.

FIG. 5 shows an iteration flow executed instead of the operation in Step S50 shown in FIG. 3 and in Step S150 shown in FIG. 4.

As shown in FIG. 5, in Step S210, the radio communication terminal 300 calculates a communication bandwidth that needs to be complemented with the radio communication system 100. In other words, using the radio communication system 100, the radio communication terminal 300 complements the insufficient communication bandwidth brought by the interference level of the radio signal received from the radio base station 200A exceeding the predetermined threshold.

In Step S220, based on the calculated communication bandwidth, the radio communication terminal 300 distributes the IP packets to be transmitted to multiple radio communication systems, specifically, the radio communication system 100 and the radio communication system 200.

(Operations and Effects)

According to the radio communication terminal 300, handover from the radio communication system 200 to the radio communication system 100 is executed, when the number of transmission repetitions (repetition) of the DL-MAP exceeds the predetermined number of times and the interference level of the received radio signal exceeds the predetermined threshold.

Moreover, according to the radio communication terminal 300, handover from the radio communication system 200 to the radio communication system 100 is executed, when the reception success rate of the DL-MAP falls below the predetermined threshold. Furthermore, it is preferable to determine the state of the radio communication terminal 300 more accurately by additionally determining whether or not the interference level of received radio signal exceeds the predetermined threshold.

For this reason, the radio communication terminal 300 can continue radio communications, while avoiding deterioration of the communication quality in the overlap area OL where the cells/sectors of the radio communication systems using the OFDMA overlap each other.

Meanwhile, further increase in the number of transmission repetitions of the DL-MAP can raise the reception success rate of the DL-MAP in the radio communication terminal 300. However, this increases a ratio of the map region M occupying in the downlink subframe $SF_{DN}$, thereby causing a problem that the throughput of the transmitted data (downlink burst) decreases. According to the radio communication terminal 300, before such throughput decrease occurs, handover from the radio communication system 200 to the radio communication system 100 is executed. Therefore, even when the radio communication terminal 300 is located within the overlap area OL, a required throughput of the transmitted data can be maintained.

Furthermore, in the present embodiment, the radio communication terminal 300 can also use the radio communication system 100 and the radio communication system 200 together, instead of the handover from the radio communication system 200 to the radio communication system 100.

For this reason, only the communication bandwidth insufficient in the radio communication system 200 can be complemented with the radio communication on system 100.

Other Embodiments

As described above, the content of the present invention has been disclosed through one embodiment of the present invention. However, the descriptions and the drawings constituting a part of the disclosure should not be construed to limit the present invention. Various alternative embodiments should be obvious to those skilled in the art from this disclosure.

For example, while the radio communication system 200 is compliant with the mobile WiMAX in the above-mentioned embodiment, the radio communication system 200 may employ any communication scheme besides the mobile WiMAX as long as it is a radio communication scheme using the OFDMA.

While the interference level of the radio signal is acquired based on the CIR in the above-mentioned embodiment, any parameter besides the CIR may be used as long as it is a parameter that can be used for determining the interference value of the radio signal. Moreover, in the processing in Step S40 (see FIG. 3) and that in Step S140 (see FIG. 4), handover may be executed, not when the interference level exceeds the predetermined threshold, but when the CIR falls below the predetermined threshold.

While the communication network is formed of the radio communication system 100 and the radio communication system 200 in the above-mentioned embodiment, the communication network may include much more radio communication systems.

While description has been made in the above-mentioned embodiment, assuming that the radio communication terminal 300 forms the radio communication device according to the present invention, a card module mounted on personal computers, Personal Digital Assistants, car navigation systems and the like may form the radio communication device. As described above, it is obvious that the present invention includes various embodiments and the like which are not described herein. Therefore, the technical scope of the present invention is only determined by constituent features of the invention according to the scope of claims appropriate to the descriptions above.

Whole contents of Japanese Patent Application No. 2007-20134 (filed on Jan. 30, 2007) are incorporated herein by reference in its entity.

INDUSTRIAL APPLICABILITY

As mentioned above, the radio communication device and radio communication method are capable of continuing radio communications while avoiding deterioration of the communication quality in an area where cells/sectors of radio communication systems using the OFDMA overlap each other, and therefore are useful in radio communications such as mobile communications.

The invention claimed is:

1. A radio communication device which is used in a radio communication system in accordance with an orthogonal frequency division multiple access scheme capable of providing a plurality of subchannels, and which is configured to receive allocation information of transmitted data for each of the subchannels from a radio base station and to execute reception processing of the transmitted data based on the received allocation information, the radio communication device comprising:
    a repetition number detector configured to detect the number of transmission repetitions of the allocation information repeatedly transmitted by the radio base station; and
    a handover executer configured to execute handover to another radio communication system different from the radio communication system when the number of transmission repetitions detected by the repetition number detector exceeds a predetermined number of times.

2. A radio communication device which is used in a radio communication system in accordance with an orthogonal frequency division multiple access scheme capable of providing a plurality of subchannels, and which is configured to receive allocation information of transmitted data for each of the subchannels from a radio base station and to execute reception processing of the transmitted data based on the received allocation information, the radio communication device comprising:
    a reception success rate calculator configured to calculate a reception success rate indicating a rate whether a reception of the allocation information was successful or not, the allocation information is repeatedly transmitted by the radio base station; and
    a handover executer configured to execute handover to another radio communication system different from the radio communication system when the reception success rate calculated by the reception success rate calculator falls below a predetermined threshold.

3. The radio communication device according to claim 2, further comprising:
    an interference value acquirer configured to acquire an interference value indicating an extent of interference of a received radio signal, wherein
    the handover executer executes the handover when the reception success rate calculated by the reception success rate calculator falls below a predetermined threshold, and also when the interference value acquired by the interference value acquirer exceeds a predetermined threshold.

4. A radio communication device which is used in a radio communication system in accordance with an orthogonal frequency division multiple access scheme capable of providing a plurality of subchannels, and which is configured to receive allocation information of transmitted data for each of the subchannels from a radio base station and to execute reception processing of the transmitted data on the received allocation information, the radio communication device comprising:
a repetition number detector configured to detect the number of transmission repetitions of the allocation information repeatedly transmitted by the radio base station; and
a communication controller configured to execute radio communication by using the radio communication system and another radio communication system different from the radio communication system when the number of transmission repetitions detected by the repetition number detector exceeds a predetermined number of times.

5. A radio communication device which is used in a radio communication system in accordance with an orthogonal frequency division multiple access scheme capable of providing a plurality of subchannels, and which is configured to receive allocation information of transmitted data for each of the subchannels from a radio base station and to execute reception processing of the transmitted data based on the received allocation information, the radio communication device comprising:
a reception success rate calculator configured to calculate a reception success rate indicating a rate whether a reception of the allocation information was successful or not, the allocation information is repeatedly transmitted by the radio base station; and
a communication controller configured to execute radio communication by using the radio communication system and another radio communication system different from the radio communication system when the reception success rate calculated by the reception success rate calculator falls below a predetermined threshold.

6. The radio communication device according to claim 5, further comprising:
an interference value acquirer configured to acquire an interference value indicating an extent of interference of a received radio signal, wherein
the communication controller executes the radio communication by using the radio communication system and the another radio communication system when the reception success rate calculated by the reception success rate calculator falls below a predetermined threshold, and also when the interference value acquired by the interference value acquirer exceeds a predetermined threshold.

7. A radio communication method which is used in a radio communication system in accordance with an orthogonal frequency division multiple access scheme capable of providing a plurality of subchannels and which includes: receiving allocation information of transmitted data for each of the subchannels from a radio base station; and executing reception processing of the transmitted data based on the received allocation information, the radio communication method comprising the steps of:
detecting the number of transmission repetitions of the allocation information repeatedly transmitted by the radio base station; and
executing handover to another radio communication system different from the radio communication system when the detected number of transmission repetitions exceeds a predetermined number of times.

8. A radio communication method which is used in a radio communication system in accordance with an orthogonal frequency division multiple access scheme capable of providing a plurality of subchannels and which includes: receiving allocation information of transmitted data for each of the subchannels from a radio base station; and executing reception processing of the transmitted data based on the received allocation information, the radio communication method comprising the steps of:
calculating a reception success rate indicating a rate whether a reception of the allocation information was successful or not, the allocation information is repeatedly transmitted by the radio base station; and
executing handover to another radio communication system different from the radio communication system when the calculated reception success rate falls below a predetermined threshold.

9. The radio communication method according to claim 8, further comprising
the step of acquiring an interference value indicating an extent of interference of a received radio signal, wherein
the handover is executed in the step of executing handover when the calculated reception success rate falls below a predetermined threshold, and also when the acquired interference value exceeds a predetermined threshold.

10. A radio communication method which is used in a radio communication system in accordance with an orthogonal frequency division multiple access scheme capable of providing a plurality of subchannels and which includes: receiving allocation information of transmitted data for each of the subchannels from a radio base station; and executing reception processing of the transmitted data based on the received allocation information, the radio communication method comprising the steps of:
detecting the number of transmission repetitions of the allocation information repeatedly transmitted by the radio base station; and
executing radio communication by using the radio communication system and another radio communication system different from the radio communication system when the detected number of transmission repetitions exceeds a predetermined number of times.

11. A radio communication method which is used in a radio communication system in accordance with an orthogonal frequency division multiple access scheme capable of providing a plurality of subchannels and which includes: receiving allocation information of transmitted data for each of the subchannels from a radio base station; and executing reception processing of the transmitted data based on the received allocation information, the radio communication method comprising the steps of:
calculating a reception success rate indicating a rate whether a reception of the allocation information was successful or not, the allocation information is repeatedly transmitted by the radio base station; and
executing radio communication by using the radio communication system and another radio communication system different from the radio communication system when the calculated reception success rate falls below a predetermined threshold.

12. The radio communication method according to claim 11, further comprising
the step of acquiring an interference value indicating an extent of interference of a received radio signal, wherein the radio communication by using the radio communication system and the another radio communication system is executed in the step of executing when the calculated reception success rate falls below a predetermined threshold, and also when the acquired interference value exceeds a predetermined threshold.

* * * * *